United States Patent
Liu et al.

(10) Patent No.: US 10,861,077 B1
(45) Date of Patent: Dec. 8, 2020

(54) MACHINE, PROCESS, AND MANUFACTURE FOR MACHINE LEARNING BASED CROSS CATEGORY ITEM RECOMMENDATIONS

(71) Applicant: Amazon Technologies, Inc., Seattle, WA (US)

(72) Inventors: Chang Liu, Beijing (CN); Chuan Xie, Beijing (CN)

(73) Assignee: Amazon Technologies, Inc., Seattle, WA (US)

( * ) Notice: Subject to any disclaimer, the term of this patent is extended or adjusted under 35 U.S.C. 154(b) by 695 days.

(21) Appl. No.: 15/465,185

(22) Filed: Mar. 21, 2017

(51) Int. Cl.
*G06Q 30/00* (2012.01)
*G06Q 30/06* (2012.01)

(52) U.S. Cl.
CPC ......... *G06Q 30/0631* (2013.01); *G06Q 30/06* (2013.01); *G06Q 30/0601* (2013.01); *G06Q 30/0603* (2013.01); *G06Q 30/0641* (2013.01); *G06Q 30/0643* (2013.01)

(58) Field of Classification Search
CPC .................................................... G06Q 30/08
USPC ................................................. 705/26.1–27.2
See application file for complete search history.

(56) References Cited

U.S. PATENT DOCUMENTS

| | | | |
|---|---|---|---|
| 6,049,777 A | 4/2000 | Sheena et al. | |
| 7,386,051 B2 | 6/2008 | Katayama | |
| 7,685,074 B2 | 3/2010 | Linden | |
| 7,881,984 B2 | 2/2011 | Kane | |
| 8,117,085 B1 * | 2/2012 | Smith | G06Q 30/0629 705/26.7 |
| 8,838,583 B1 | 9/2014 | Fox | |
| 10,083,521 B1 | 9/2018 | Dhua et al. | |
| 10,102,559 B1 | 10/2018 | Jain et al. | |
| 10,109,051 B1 | 10/2018 | Natesh et al. | |
| 2013/0084001 A1 * | 4/2013 | Bhardwaj | G06T 7/41 382/165 |

(Continued)

OTHER PUBLICATIONS

Hu, Rong, Pu, Pearl "Helping Users Perceive Recommendation Diversity", 2011, CEUR Workshop Proceedings. 816. 43-50, accessed at [http://ceur-ws.org/Vol-816/paper6.pdf]. (Year: 2011).*

(Continued)

*Primary Examiner* — Jeffrey A. Smith
*Assistant Examiner* — Lindsey B Smith
(74) *Attorney, Agent, or Firm* — Knobbe, Martens, Olson & Bear, LLP

(57) ABSTRACT

A recommendation system increases the diversity of item recommendations provided to a target user by using machine learning to generate rules for identifying cross-category collections of items. For example, a first machine learning technique can be used to generate combination rules, representing categories of items frequently bought together, and these rules can be applied to generate a listing of cross-category seed item-recommended item pairs. These item pairs can be passed through a set of validation rules, generated by a second machine learning technique and representing correlations between attributes of items frequently bought together, to generate a confidence score representing the likelihood that a customer will want to purchase those two items together. The confidence score can be based on correlating one or more of color, price, seasonality, freshness, brand affinity, customer reviews, or item detail page views of the two items.

15 Claims, 7 Drawing Sheets

(56) References Cited

U.S. PATENT DOCUMENTS

| | | | | |
|---|---|---|---|---|
| 2014/0046965 A1* | 2/2014 | Tian | ................... | G06F 16/2457 |
| | | | | 707/749 |
| 2014/0172627 A1* | 6/2014 | Levy | ................. | G06Q 30/0631 |
| | | | | 705/26.7 |
| 2014/0279208 A1* | 9/2014 | Nickitas | ............ | G06Q 30/0631 |
| | | | | 705/26.7 |
| 2015/0262069 A1* | 9/2015 | Gabriel | .............. | G06F 16/9535 |
| | | | | 706/48 |

OTHER PUBLICATIONS

Knight, Amazon has developed an AI fashion designer, MIT Technology Review (Aug. 24, 2017), https://www.technologyreview.com/s/608668/amazon-has-developed-an-ai-fashion-designer/.

* cited by examiner

MACHINE, PROCESS, AND MANUFACTURE FOR MACHINE LEARNING BASED CROSS CATEGORY ITEM RECOMMENDATIONS

BACKGROUND

A computer-based recommendation service algorithmically selects items, e.g., goods (physical and/or digital) and/or services, to recommend to users. One common application for recommendation services involves recommending items for purchase, rental, subscription, viewing, or some other form of consumption. For example, some e-commerce sites provide services for recommending items to users based wholly or partly on the ratings assigned by the users to particular items. The recommendations may additionally or alternatively be based on the users' order histories, purchase histories, rental histories, item viewing histories, item tagging activities, and/or other behavioral profiles. Recommendation services are also commonly used to recommend web sites, news articles, music and video files, television shows, restaurants, and other types of items.

Some recommendation services present users with lists of items that are related to the item they are currently viewing. These lists may be based on aggregated purchase histories or item viewing histories of users, and are typically presented on catalog pages of an electronic catalog. For example, when a user accesses the item detail page for a particular item, the user may be presented with a list of items frequently purchased by those who purchase this item, and/or with a list of items frequently viewed by those who view this item. These lists assist users in identifying additional items that are complementary to, or are substitutes for, the item being viewed.

BRIEF DESCRIPTION OF THE DRAWINGS

Specific embodiments and inventive features will now be described with reference to the drawings, which are provided for purposes of illustration, and not limitation.

DETAILED DESCRIPTION

Figure 1:
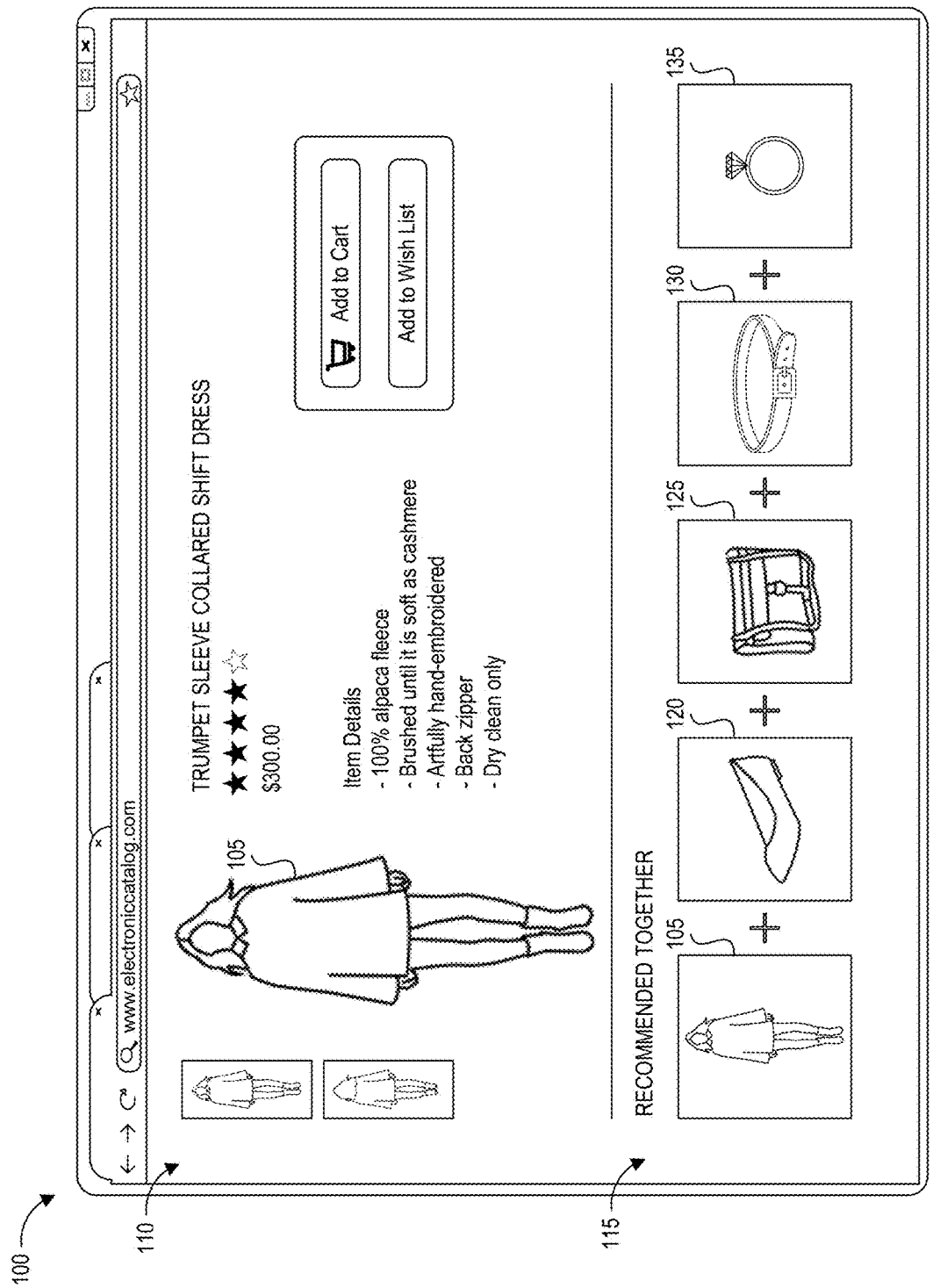
FIG. 1 illustrates an embodiment of a user interface that presents a user with cross-category item collection recommendations.

Developers of electronic commerce ("e-commerce") sites and systems often attempt to streamline the user experience by using recommendation services to provide users with content, including recommendations (personalized and general) of items available from an electronic catalog. A recommendation may be based on, for example, item relationships indicating items that the system determines that a user may wish to view or purchase based on the item viewing history or purchase history of the user. These item relationships can be determined by analyzing user purchase histories, product viewing histories, and/or other types of recorded behavioral data reflecting users' interests in particular items. The process of detecting behavior-based item relationships may be repeated periodically (e.g., once per day or once per week) to incorporate the latest purchases or other behaviors of users. Some recommendation systems generate and use directional item-to-item association mappings. For example, if users who purchase item A tend to purchase item B at a later date, the directional mapping A→B may be created. This mapping may, for example, be used as a basis for recommending item B to users who view, purchase, favorably rate, or otherwise exhibit an interest in, item A. (In this example, item A is the "recommendation source item," or simply "recommendation source," since it serves as the source or basis for recommending item B.)

Purchase-history-based related items typically represent complementary items commonly purchased together with an item under consideration, while view-history-based related items typically represent similar alternatives or substitutes explored by users. One problem with these approaches is that the related items presented to the user are often of the same type, for example mainly from the same category, and as such, customers have to manually search for accessory products. Both approaches can thus make it difficult for users to quickly identify complementary products in other categories. Further, these existing approaches often fail to recommend new or existing items that lack views or sales. This can impede users' ability to discover other types of complementary or accessory items, particularly in a large selection pool.

The foregoing and other problems are addressed, in some embodiments, by the disclosed machine learning techniques for identifying cross-category collections of item recommendations. The disclosed machine learning methods can be used to discover both (1) behavior-based relationships between item categories (e.g., users who purchase an item in category X also purchase an item in category Y, and (2) behavior-based relationships between particular items (e.g., users who purchase A also purchase B). The recommendations system can then use these two types of relationships in combination to select cross-category items to recommend. In some implementations, the disclosed machine learning methods can be used to discover weighted factors that influence user purchase decisions by analyzing user purchase histories and item attribute information (e.g., category, brand, keywords, etc.). The cross-category items recommendations can be validated using these weighted factors to determine how likely a user may be to purchase the items together. Accordingly, the present disclosure provides a recommendation system and associated user interface that presents users with behavior-based, cross-category item recommendations, for example during browsing of an electronic catalog by the user. To illustrate, consider FIG. 1. When the user is viewing a content page 100 (e.g., a product detail page) used to convey information 110 about a source product (dress 105), the system can either generate (or retrieve a pre-generated list) of a cross-category collection items 115 for presentation to the user. In the illustrated example, the source item is dress 105, and the collection of cross-category item recommendations includes shoes 120, handbag 125, belt 130, and ring 135. Each of these items in collection 115 is selected from a different respective category that, based on analyzed purchase histories of users, is a category from which users making dress purchases tend to make an associated purchase. These particular items being recommended are not necessarily items that have actually been purchased by a purchaser of this particular dress. By (1) identifying category associations in user purchase histories, (2) pairing items based on category associations, (3) identifying weighted item attribute factors influencing user purchase decisions, and (4) scoring these pairs based on these weighted item attribute factors, the disclosed recommendation system can identify such collections of items that are well suited for purchase together even if the items have not yet been purchased together. As such, the present recommendations system can automatically assist a user with purchasing not just a single item (in the example of FIG. 1, dress 105) but rather a collection of coordinated or related items across multiple categories (in the example of FIG. 1, a coordinated outfit). This can solve both the customer pain point of finding related products efficiently as well as the business pain point of product discoverability in a large selection pool.

For example, cross-category matching of similar items can be accomplished by using combination rules, generated via machine learning and representing categories of items frequently bought together, to generate a listing of cross-category seed item-recommended item pairs. These item pairs can be passed through a set of validation rules, generated via machine learning and representing correlations between attributes of items frequently bought together, to generate a confidence score representing the likelihood that a customer will want to purchase those two items together. This enables the user to be presented with a cross-category collection representing relatively wide range of items that are complementary to the item being viewed.

In order to generate these rules, historic purchase order data can be used to train a first machine learning algorithm to identify (1) pairs of items frequently bought together and (2) customer behavior data indicating category-category associations of items frequently bought together. The customer behavior data can be converted into the collection combination rules. A second machine learning algorithm can be trained by input data including (1) the identified pairs of items frequently bought together and (2) data representing attributes of the items. The output of the second machine learning algorithm includes weighted factors influencing customer decisions to purchase items together, which are used to generate the validation rules. The validation rules can be used to generate an item-item confidence score based on correlating one or more of color, price, seasonality, freshness, brand affinity, customer reviews, or item detail page views of the two items.

The validation rules can include color coordination scoring for determining whether the two items in an item-item pair are likely to be perceived as aesthetically matching or coordinated by a human. In some embodiments, color coordination scoring can be performed for certain types or categories of items, such as apparel and home decor, for which color coordination tends to matter to users. Color coordination scoring between first and second items in an item-item pair can include, for both items: (1) extracting a palette of colors from a main image of the item, (2) identifying a key color in the palette and at least one additional color in the palette, the key color being the dominant color of the item and the additional color being a secondary color of the item, and (3) representing each color as x,y,z coordinates within a Euclidean space. The color coordination scoring can further include calculating the Euclidean distance between the key color (and optionally its complementary color) of the first item and the key color of the second item, as well as calculating the Euclidian distance(s) between the pair(s) of additional colors (and optionally their complementary colors) of the first and second item. Closer distances can indicate more analogous colors. The minimum distance can be selected from these values and then rescaled, for example using Gaussian distribution, to provide a color coordination score between 0 and 1. Scores closer to 1 can indicate a higher likelihood that the colors of the two items will be perceived together as harmonious by a human observer.

To illustrate an example of generating and using the described rules for cross-category item collection recommendations, some embodiments can use a first machine learning algorithm to infer the cross-category shopping patterns (Customer Bought from category X also Bought from category Y) from purchase history orders and convert these identified patterns into category combination rules. A second machine learning algorithm can use "frequently purchased together" item sets to infer the factors and weights that indicate the likelihood that any two items could be purchased together by a customer. These factors and weights can be converted into the validation rules. These sets of rules, while initially generated automatically by machine learning to identify patterns in user behavior, can optionally be adjusted manually according to the design requirements of a particular implementation of the disclosed recommendations engine. For example, a set rule can be defined manually in the circumstance that machine learning cannot infer customer behaviors due to lacking enough data samples. Advantageously, this can avoid making arbitrary recommendations dependent completely on the machine learning algorithms. Thus some embodiments can be considered as a supervised machine learning cross category recommendation algorithm. The recommendations engine can use the generated rules to identify candidate pairs (one seed item, one recommended item) and to validate for each pair whether the recommended item should be recommended. Validated pairs (e.g., pairs having a "purchase together" probability score that satisfies a threshold) from different categories can be combined into cross-category collection sets based on category combination rules.

The recommended product collections can be displayed, as shown in FIG. 1, on an item detail page or other electronic catalog page. For example, a mobile presentation can organize recommended products in a "card" style, where the user can sweep a card to the right or left to view a different set of recommendations. As another example, a desktop browser presentation can display item thumbnail images in a half-folded view, and the user can select a "view more" button to expand the fold and view more items. These example user interfaces can allow for a visually compact and pleasing presentation of collections of many items. The recommendations can also be presented in a message to a user, for example an email, text message, in-app message, and the like.

The cross-category item collection recommendations service and associated user interface may be used with any type of interactive system (such as a web site, a mobile application based system, or an interactive television system) that generates item recommendations for users. For example, the user interface may be part of an interactive system that provides functionality for users to purchase, rent, download, and/or stream items selected from an electronic catalog. The items may, for example, include physical items that are shipped to users, digital items (e.g., music tracks, electronic books, videos, mobile applications, etc.) that are transmitted to users' computing devices, or a combination thereof. It can be useful to present a user with a diverse set of such cross-category item recommendations rather than a set containing many variations of the same type of item or of popular-only complementary items. In addition to use for presenting cross-category item collections in an electronic catalog, the user interface may also be used in systems that present diverse groupings of various other types of items to users, such as collections of advertisements presented in other digital content environments, as well as entertainment event services, vacation booking services, and other systems.

As used herein, the term "item," in addition to having its ordinary meaning, is used interchangeably to refer to an item itself (e.g., a particular product) and to its description or representation in a computer system or electronic catalog. As will be apparent from the context in which it is used, the term may also sometimes be used herein to refer only to the item itself or only to its representation in a computer system.

Overview of Example Recommendations Engine and Machine Learning Aspects

Figure 2A:
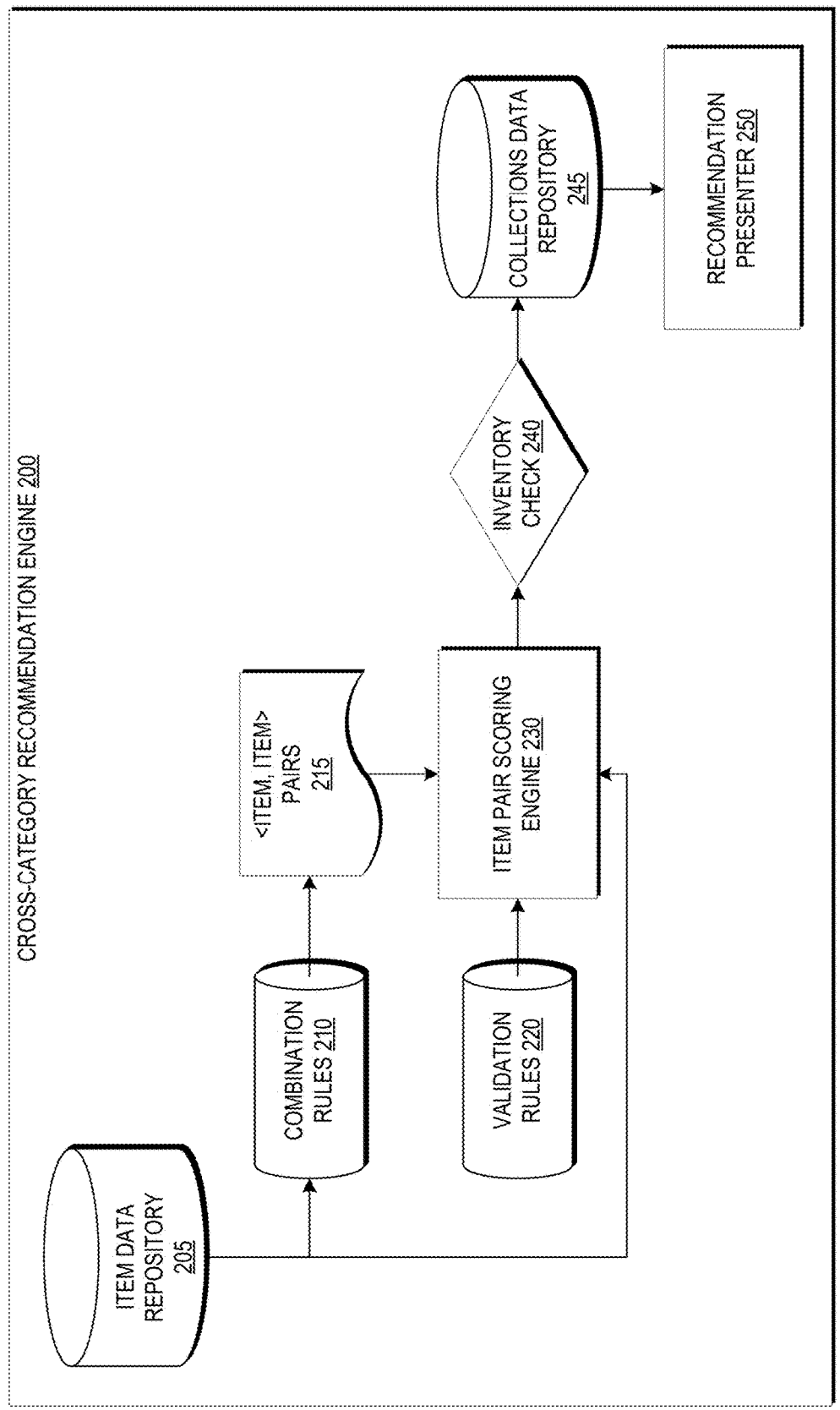
FIG. 2A illustrates a schematic block diagram of a cross-category item collection recommendation engine that can generate recommendations such as those shown in FIG. 1.

FIG. 2A illustrates a high level schematic block diagram of a cross-category recommendation engine 200 that can generate recommendations such as those shown in FIG. 1. The recommendation engine 200 includes item data repository 205, combination rules 210, a listing 215 of <item, item> pairs output from the combination rules 210, validation rules 220, an item pair scoring engine 230, an inventory check module 240, a collections data repository 245, and a recommendation presenter 250.

The combination rules 210 can be generated as discussed below with respect to FIG. 2A and can specify which categories should be associated for purposes of generating cross-category recommendations. The validation rules 220 can be generated as discussed below with respect to FIG. 2A and can be used to validate candidate item pairs based on one or more of department name, color matching, price matching, seasonality, freshness, brand affinity, customer review ratings, and other suitable item matching metrics.

In the illustrated example of a cross-category recommendations process, the combination rules 210 can filter information representing a listing number of items in item data repository 205, for example item identifiers and item attributes for each item. Item attributes can include category, item type keyword, product type, average customer review rating, glance view band (for example, a ranking or score generated based on number and/or frequency of views), department, seasonality, and the like. The combination rules 210 can filter the items by product type and/or item type keyword and then generate a list of candidate <item, item> pairs. These <item, item> pairs can represent cross-category item matchings. For example, combination rules 210 can generate <item, item> pair of an item in category A to an item in category B based on a rule representing mined user behaviors that customers who purchase items in category A also purchase items in category B.

Figure 2B:
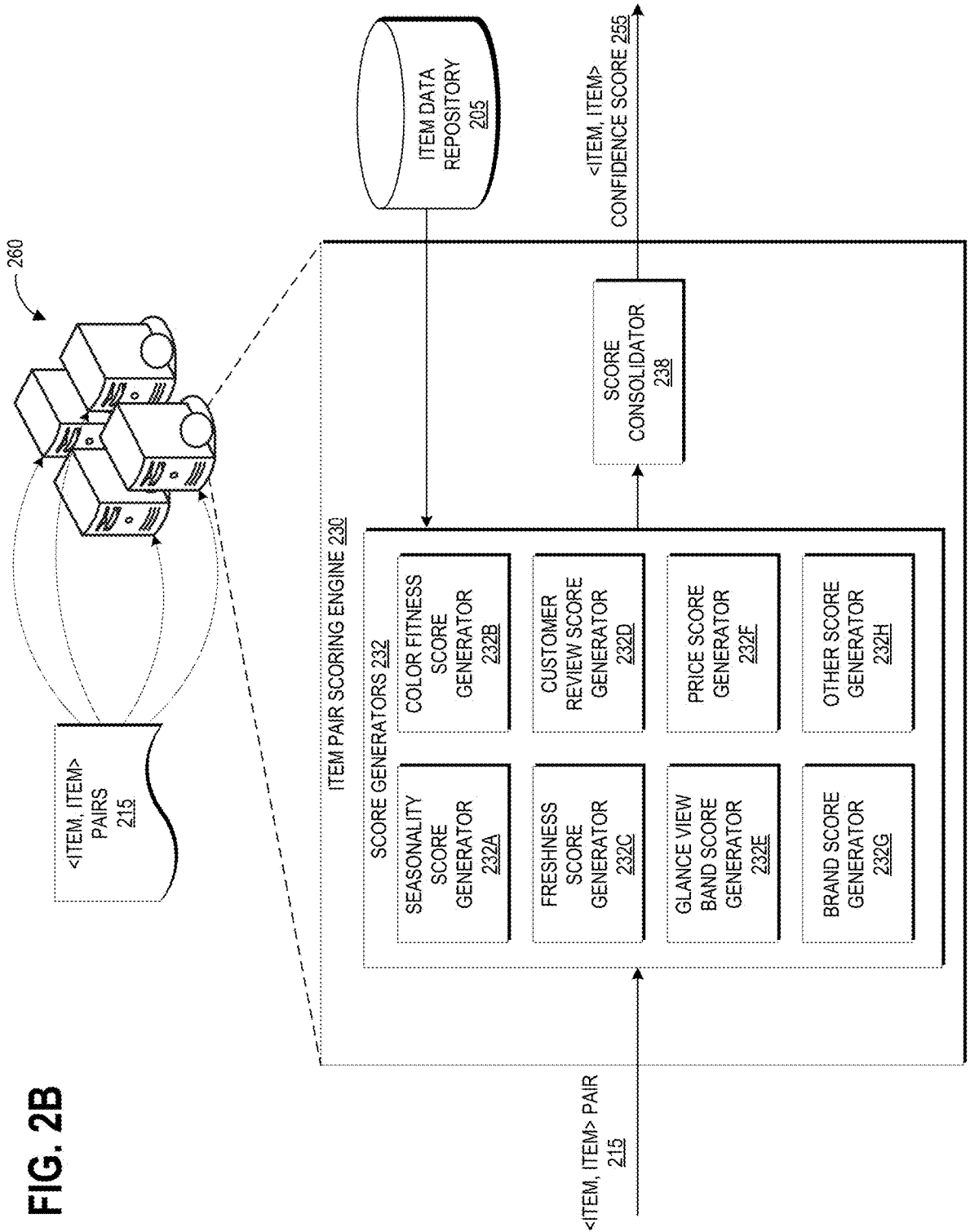
FIG. 2B illustrates a schematic block diagram of an embodiment of the item pair scoring engine of FIG. 2A.

Each <item, item> candidate pair will pass through a validation pipeline that implements validation rules 220 using attributes of the items from the item data repository 205 in item pair scoring engine 230, as discussed in more detail with respect to FIG. 2B. Some pairs may be filtered out if they violate any essential validation rules. The validated pairs can be scored based on a number of item affinity metrics including color matching, price matching, seasonality, and the other metrics discussed with respect to FIG. 2B.

The inventory check 240 can confirm whether items in an <item, item> pair or in a collection are buyable (for example, currently in stock in an inventory listing). If any recommended item is not buyable, it can be disabled from recommendation temporally and re-checked in a next publishing cycle.

Collections data repository 245 can be used to store representations of <item, item> pairs and associated confidence scores and/or collections of recommended items. Returning to the example of FIG. 1, based on the combination rules the category "dress" can be associated with "shoes," "handbag," "belt," and "jewelry." As such, an item in each of these categories (shoes 120, handbag 125, belt 130, and ring 135) can be identified as a recommended item associated with seed item dress 105. For example, this can be done by ranking the candidate pairs having the dress as the seed item by the category of the recommended item and by the associated confidence score in order to identify the pair having highest confidence score.

The recommendation presenter 250 can select a number of <item, item> pairs to recommend together as a collection to users. In some examples these can be pre-stored collections in the collections data repository 245. In other examples these recommendations can include elements of user personalization, and can be selected based on user personalization factors as well as the confidence scores associated with <item, item> pairs in the collections data repository 245. The recommendation presenter 250 can cause a representation of a collection to be output to a user device for display to a user.

Such cross-category item collection recommendations may be exposed to users in various contexts. For example, in the context of a shopping site, such recommendations may be presented when a user views a content page associated with a source item, as shown in FIG. 1, or together with a recommended source item. The user interface may thereby enable the user to rapidly determine complementary items from a number of categories for potential purchase with the source item. Such recommendations can be presented to users at other times, for instance upon logging in to the shopping site, via email or other electronic messaging, or as advertisements when the user is visiting other web sites. The depicted page layout in user interfaces 100 is provided for illustrative purposes, and other user interface embodiments capable of providing cross-category item collection recommendations can include more or fewer sections, combined sections, different sections, other page element arrangements, and other interactivity options for enabling user interactivity. As will be recognized, the user interface may alternatively be implemented without using web pages. For example, the user interface may be implemented within a mobile application (such as a smartphone application), via email, and/or within the native software of an e-book reader or a tablet computing device, and the appearance of the user interface can be adapted for presentation in different contexts and/or on a number of different kinds of user computing devices.

The recommendations engine 200 can run offline for storing pre-generated lists in some embodiments, and in other embodiments can run online for dynamically generating cross-category item collection recommendations based, for example, on user page requests.

FIG. 2B illustrates a schematic block diagram of an embodiment of the item pair scoring engine 230 of FIG. 2A.

The item pair scoring engine 230 can receive inputs of a number of <item, item> candidate pairs 215 and input each pair into a number of scoring generators 232. The scoring generators 232 can receive needed information about the items in the candidate pairs from an item data repository 205, for example item attributes, item images, item reviews, and other data described below.

As shown, the item pair scoring engine 230 can be implemented in parallel on a number of different computing devices 260 in order to more rapidly compute confidence scores 255 for a large number of <item, item> candidate pairs 215. In some implementations, a large percentage of the computing resources needed to generate the cross-category collection recommendations can relate to the item pair scoring. The item pair scoring can involve iterating each pair of candidate items and calculating the confidence score 255, thus some embodiments can split the scoring computing task into multiple sub-tasks and run in the nodes of a distributed computing environment 260. Some implementations can adopt Hadoop+Spark frameworks to support the distributed computing. For example, the candidate item pair list can be parallelized by Spark and mapped to Spark executers in each physical node. Each node can run validation functions in parallel and store the result in HDFS. Finally, another process can retrieve the result from HDFS and write into a database of confidence scores255. According to one experiment, one CPU core (3.2 GHz) can process 400 pairs per second, so the total capability can be smoothly scaled up by adding more nodes.

The seasonality score generator 232A can generate a score representing a level of seasonality affinity between items in an item candidate pair. For example, first the seasonality score generator 232A can normalize seasons attribute value to spring, summer, fall, winter, or year-round. Then the seasonality score generator 232A can use a scoring card to cross-compare the seasons of the seed item and recommended item in a pair, and can choose a highest score to output as the seasonality score. One example of a scoring card is shown below in Table 1.

TABLE 1

Seasonality Scoring Card

|  | spring | summer | fall | winter | year-round |
|---|---|---|---|---|---|
| spring | 1.0 | 0.4 | 0.4 | 0.4 | 0.6 |
| summer | 0.4 | 1.0 | 0.4 | 0.0 | 0.6 |
| fall | 0.4 | 0.4 | 1.0 | 0.4 | 0.6 |
| winter | 0.4 | 0.0 | 0.4 | 1.0 | 0.6 |

Figure 4A:
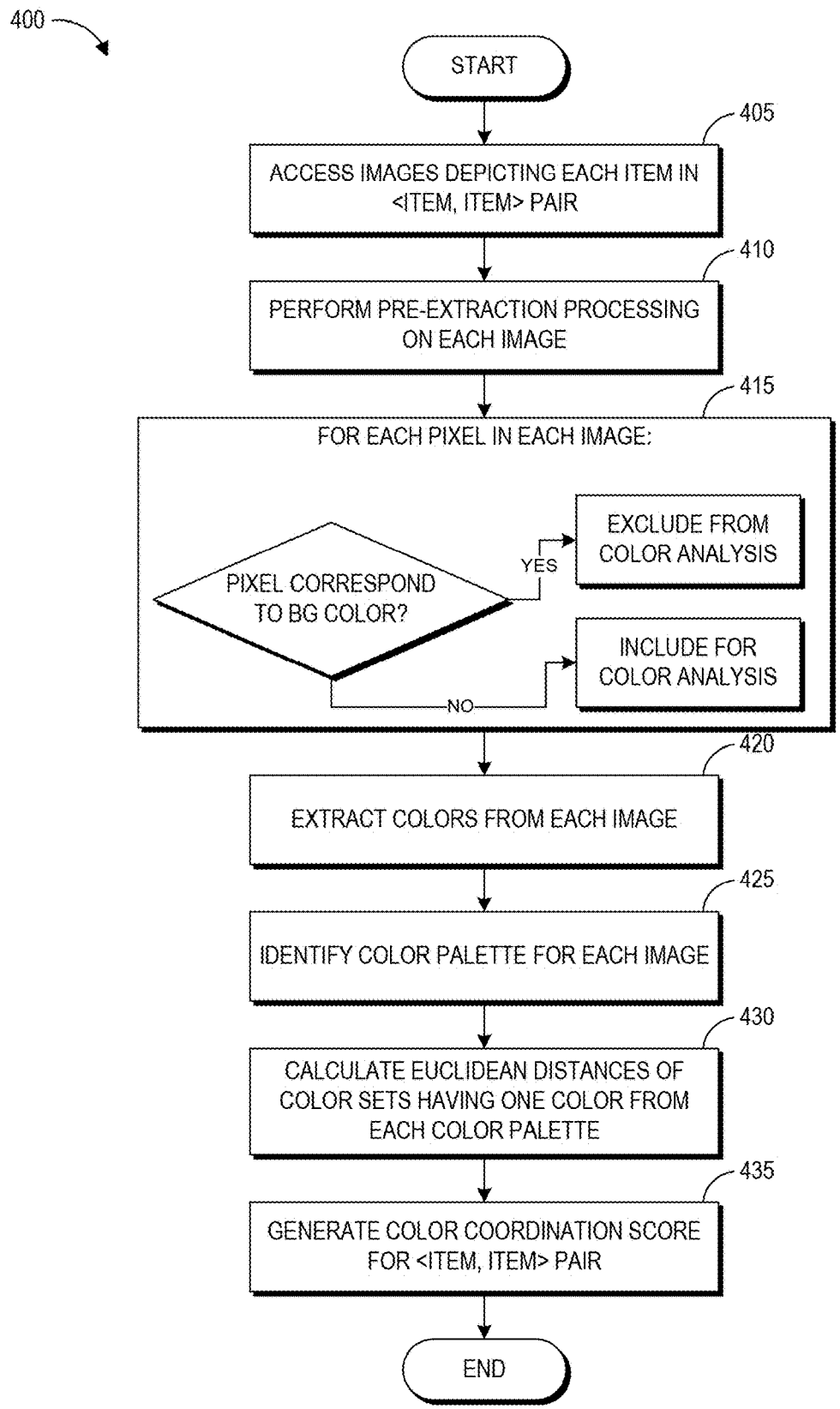
FIG. 4A is a flow diagram depicting an illustrative embodiment of a process that may be implemented by an interactive system, such as the item pair scoring engine of FIG. 2B, to generate color coordination scores for a pair of items.
Figure 4B:
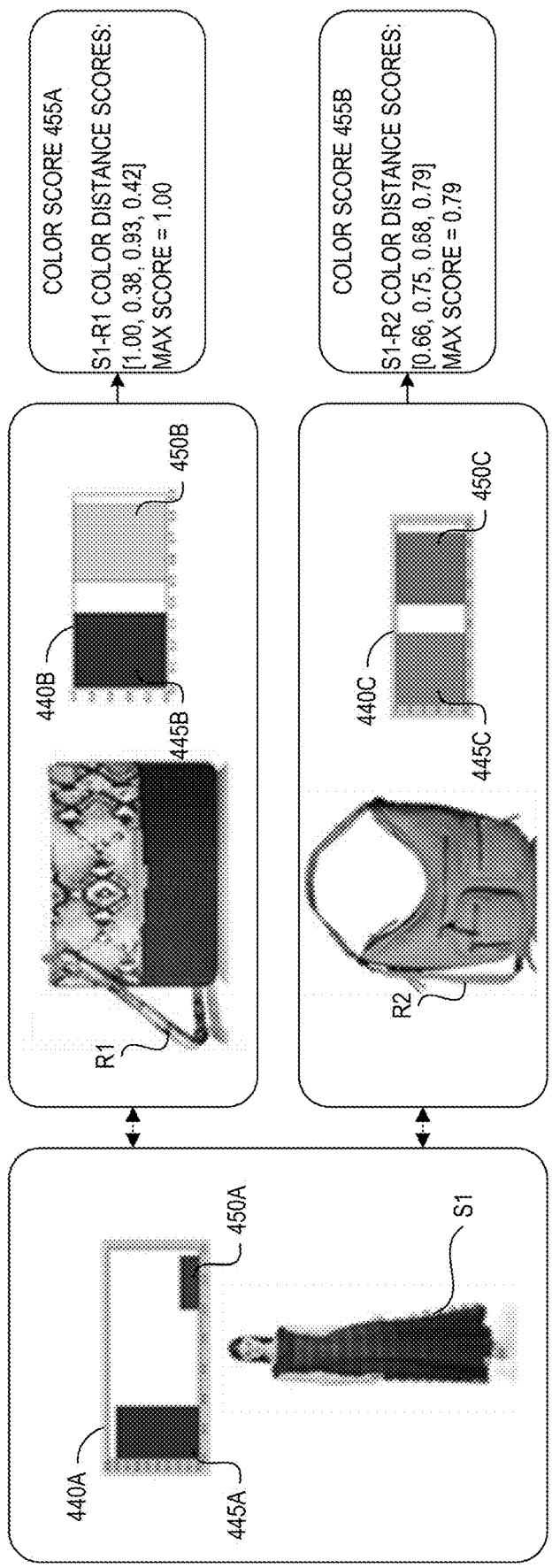
FIG. 4B is a graphical representation of the color coordination scoring process of FIG. 4A.

The color fitness score generator 232B can generate a score representing a level of aesthetic color coordination between items in an item candidate pair, as discussed in more detail with respect to FIGS. 4A and 4B. For example, color score generator 232B can analyze an item of each item in a pair by extracting the dominant colors and complementary colors from the color palette of the image, representing the colors in RGB color space for example as (X, Y, Z) coordinates in a Euclidean space, and generating a score representing a level of coordination between the color(s) of the two items. To generate the score, the color score generator 232B can compare the Euclidean distance between the two colors, where a shorter distance means the colors are more analogous colors, which can indicate colors that can look like more harmonious to the human eyes. Some embodiments of color coordination scoring can involve three primary steps: (1) image preprocessing, (2) color clustering, and (3) colors comparison and scoring.

With respect to freshness score generator 232C, some embodiments of the item pair scoring engine 230 can be designed to use freshness score generator 232C to recommend the latest items. This freshness calculation can be applied to all item candidate pairs or only to item candidate pairs in categories determined to be relevant to freshness, for example electronics and apparel. In one example, the freshness score generator 232C can compare the site launch date of a recommended item and the current date. It the difference is within 0.25 year then the freshness score generator 232C can give a score of 1.0, otherwise the freshness score generator 232C can use a Gaussian distribution ($\mu$=0.25, $\sigma$=1) to rescale the score. One example formula and parameters that can be used by freshness score generator 232C is:

$$\text{If } x < 0.25, \text{ then } y = 1.00, \text{ else } y = \exp\left(-\frac{(x-\mu)^2}{2\sigma^2}\right), \mu = 0.25, \sigma = 1$$

The customer review score generator 232D can generate a score representing a level of affinity or correlation between customer reviews items in an item candidate pair. This can be based, for example, on a number of customer reviews (scaled to a value between 0-1 in some embodiments), where a higher number indicates a more popularly reviewed item, and/or on the average rating of the item (scaled to a value between 0-1 in some embodiments), where a higher number indicates a more highly rated item.

With respect to price score generator 232F, some embodiments of the item pair scoring engine 230 can be designed to use price score generator 232F so that the recommended items in a collection are of comparable price (or price range or percentile for the particular item type). For example, if a recommended item is too expensive, a customer might lose interest to buy it together with the seed item, so in some embodiments the recommended item's price should not be more than X times of seed item's price. We also use Gaussian distribution to rescale the ratio(X) of Price A/B to score (0-1). One example formula and parameters that can be used by price score generator 232F is:

$$\text{If } x < 1, \text{ then } y = 1.00, \text{ else } y = \exp\left(-\frac{(x-\mu)^2}{2\sigma^2}\right), \mu = 1, \sigma = 1$$

The brand score generator 232G can generate a score representing a level of affinity or correlation between the brands of items in an item candidate pair.

Other score generators 232H can be incorporated as needed, for example based on identifying other factors in validation rules that influence customer purchase decisions for purchasing two items together.

Each <item, item> pair can be validated using some or all of these score generators, for example as specified in the validation rules 220. The subset of score generators used to validate a particular <item, item> pair can be specified in the validation rules 220 based on factors and weights mined from user behaviors and optionally manually adjusted as described above.

The scores generated by the score generators 232 can be passed to the score consolidator 238, which can apply weights specified in validation rules 220 to generate a final <item, item> confidence score 255 representing a likelihood that a customer would desire to purchase the items in the candidate pair together. In some embodiments, all scores can be scaled to a number between 0 and 1, where a final confidence score closer to 1 can indicate a higher likelihood that a customer would purchase the items in the candidate pair together.

Figure 3:
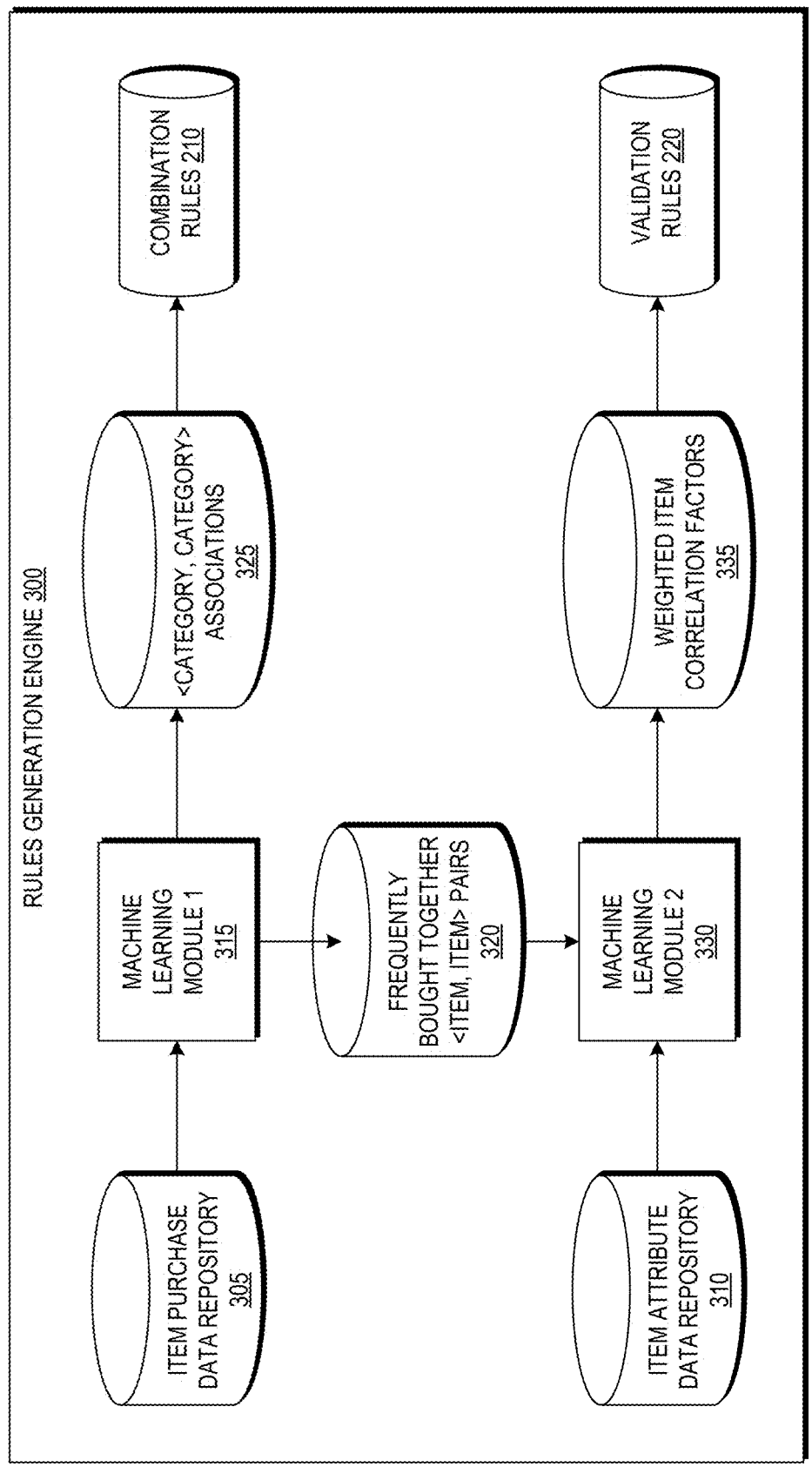
FIG. 3 illustrates a schematic block diagram of a rules generation engine that can generate combination rules and validation rules usable by the cross-category item collection recommendation engine of FIG. 2A.

FIG. 3 illustrates a schematic block diagram of a rules generation engine 300 that can generate the combination rules 210 and validation rules 220 used by the cross-category recommendation engine 200 of FIG. 2A. Rules generation engine can include an item purchase data repository 305, first machine learning module 315, data repository of frequently bought together item pairs 320, item attribute data repository 310, second machine learning module 330, data repository of category to category associations 325, combination rules 210, data repository of weighted item correlation factors 335, and validation rules 220.

The item purchase data in purchase data repository 305 can include purchase histories of a number of users of an electronic catalog. For example, each user can have an associated purchase history that includes the orders placed by the user and the items in each order.

As shown in FIG. 3, rules generation engine 300 can use historic purchase order information to learn customer cross-category shopping behaviors and to find factors that impact customer purchase decisions. Rules can be inferred by machine learning and can be adjusted manually according to the business requirements. There are two sets of rules: (1) Cross-Category Collection combination rules 210, which can be used to decide which categories are included in a product collection set, and (2) Validation scoring rules 220, which can be used to validate item pairs in terms of affinity in department name, color, price, seasonality, freshness, brand, customer review ratings, and the like. The combination rules 210 structure can be composed by a set list, wherein each set contains seed, recommends and validators sections. The seed and recommends sections can define the item's category via product type identifier (PTD) and item type keyword (ITK). The validators section can define the specific validators that will be used to generate a confidence score for the item pair as well as the weights for each of the validators.

The first machine learning module 315 can receive item purchase data from item purchase data repository 305 and generate both a listing of frequently purchased together item pairs and a listing of category-category associations based on these item pairs. In some embodiments, the first machine learning module 315 can implement a frequent pattern growth (FP-growth) algorithm. FP-growth is an algorithm for frequent item set mining that aims to find regularities in the shopping behavior of customers. In particular, FP-growth seeks to identify sets of products that are frequently bought together. As used herein, "bought together" or "purchased together" can refer to two items being bought/rented as part of the same order or within some time period of each other by the same user, such as 1 day or 1 week. The rules generation engine 300 can input item purchase data from item purchase data repository 305 into the FP-growth algorithm to mine frequent patterns of "Customer Who Bought from Category X also Bought from Category Y." As such, the first machine learning module 315 can infer the cross-category shopping patterns of users. These patterns can be stored in the data repository of category to category associations 325, for example as a seed category and one or more recommended categories associated with the seed category. In some embodiments, the data repository of category to category associations 325 can be manually adjusted after generation by the first machine learning module 315. As an example, a collection could include an item from the seed category and an item from each of the associated recommended categories, depending upon the validation scores of actual item-item pairs generated based on the collection combination rules.

Other embodiments can use item interaction data including events other than or in addition to purchases. Item interaction events can include item detail page views, adding items to a digital shopping cart or wish list, item reviews, sharing of item detail pages, and saving an item for later purchase. For example, some embodiments can analyze events relating to items frequently interacted with together by a user, for example within a predetermined time interval (one day, one week, etc.), within the same browsing session, within a single login to the electronic catalog, and the like.

Considering that in typical systems there can be millions of order records, it can be impractical to use a standard Aprior or FP-growth in a single machine. Thus some embodiments can implement a map-reduce FP-growth algorithm to mine the data. In some embodiments, the first machine learning module 315 can perform three steps to identify output data 320, 325 via map-reduce FP-growth algorithm: (1) preprocessing, (2) running the FP-growth algorithm, and (3) filtering.

For the first step (preprocessing), the first machine learning module 315 can aggregate the items in the item purchase data repository 305 by order. For example, the order raw data can pass through a map-reduce computing flow to generate the data in a format having an order ID and the items that were purchased in that order. The use pre-processed order data can be statistically analyzed to identify the frequency (total times of purchase) of each item. The output of this step can be an array list of purchased items each associated with its purchase frequency.

For the second step (running the FP-growth algorithm), the first machine learning module 315 can use the pre-processed order data and frequency data generated from above the steps as inputs. For example, the first machine learning module 315 can randomly split the frequency data into N groups, then allocate the order records into a group if it contains the frequency item. By this technique, the orders can be split into N groups with possibility for some duplicated records within groups. Next the first machine learning module 315 can run FP-growth computing for each group, filter out any frequent <item, item> associations that do not meet a mini support threshold, and output a set of frequent <item, item> associations with redundancy.

For the third step (filtering), the first machine learning module 315 can filter out the redundant frequent <item, item> associations. Thus the output of the first machine learning module 315 can include frequent <item, item> associations with maximum frequency value only. These can be stored as the frequently bought together <item, item> pairs 320.

To understand the <category, category> associations in patterns of customer cross category shopping behavior 325, the first machine learning module 315 can apply a similar process of steps 1-3 but can use customer identifiers as a key to aggregate ITK (item_type_keyword) in the pre-preprocess stage. The first machine learning module 315 can use the same map-reduce flow as described above to mine the frequent patterns of "customer who bought item in ITK X also bought items in ITK Y," and can store these as <category, category> associations in data repository 325.

The second machine learning module 330 can receive the frequently bought together item pairs 320 output from the first machine learning module 315 as well as data representing item attributes from the item attribute data repository 310. The item attributes can include category, price, freshness (for example, how recently an item was added to the electronic catalog), brand, customer review scores, keywords, seasonality of the item, glance view band (for example, a score generated based on customer views of the item), and the like. The second machine learning module 330 can apply logistic regression to these data sets in order to infer the key factors and associated weights that lead customers to purchase together the items in the pairs identified by the first machine learning module 315. These can be stored in the data repository of weighted item correlation factors 335, optionally manually adjusted, and used to generate validation rules 220.

As described above, some embodiments rules generation engine 300 can first use FP-growth to mine FBT (Frequent Bought Together) item pairs in certain categories (e.g., apparel, shoes). These can be used to define a set of positive samples. The rules generation engine 300 can then randomly compose item pairs from the same categories and use these randomly generated pairs to define a set of negative samples. In one embodiment, to reduce occasions, the rules generation engine 300 can generate 25 different negative sample groups to companion with FBT data, and run logistic regression using the second machine learning module 330 for 25 rounds. The rules generation engine 300 can use average (5% Trimmed) of coefficient and intercept from those 25 rounds of regression to implement the regression formula:

$$P(y) = \frac{1}{1 + e^{-(Intercept + \Sigma Coef_i * X_i)}}$$

In some embodiments there can be three types of validators: (1) essential validators, (2) scoring validators, and (3) publishable validators.

An essential validator can be defined as a validator wherein if, during item pair scoring, the essential validator returns "false" then the validation procedure is terminated, and the item pair scoring engine 230 can skip to the next <item, item> candidate pair. Examples include department name comparison, which checks whether department names of seed item and recommended item are the same (for example dress+shoes); and hardware platform comparison (for PC products), which checks whether the platform is the same type (for example PC+PC, MAC+MAC).

Scoring validators can compute a score for the <item, item> candidate pair, and each validator's score can be aggregated using identified weight factors to generate a final confidence score, for example using Logistic algorithm. In some embodiments the scoring validator scores and final confidence score can each be scaled to be represented as a number between 0-1. Examples of scoring validators include color coordination, price match, and seasonality, to name a few.

Publishable validators can check the buyability of a recommended item in an <item, item> pair. Failing this validator can cause the recommendation to be temporarily disabled and queued for re-checking in a next cycle. For example, an inventory availability validator can check whether a recommended item has available inventory.

The final combination and validation rules can be stored in XML format in some examples, and the final format can be editable by a system administrator in order to adapt the generated rules to specific business purposes.

In addition to the common strong factors such as category, brand, and customer review count, some hidden factors that impact the customer behavior also be found in the weighted item correlation factors 335, for example price, customer review rating, glance view band, and color coordination. Coefficient and intercept parameters of those hidden factors can be used to determine the confidence of recommendation.

FIG. 4A is a flow diagram depicting an illustrative embodiment of a process 400 that may be implemented by an interactive system, such as the color score generator 232B of FIG. 2B in some embodiments, to generate color coordination scores for a pair of items. FIG. 4B is a graphical representation of an example of the color coordination scoring process of FIG. 4A. FIGS. 4A and 4B are discussed together below.

At block 405, the process 400 can access images depicting each item in an <item, item> pair. For example, as discussed above, the <item, item> pair can include a source item and a recommended item. The process 400 can identify a primary image of each item in some embodiments, for example an image having a white background depicting a complete view of the item. These images are the product images included in the electronic catalog, and are typically provided by the manufacturers or sellers of the items.

At block 410, the process 400 can perform pre-extraction processing on each image. Such image preprocessing can include compressing the image to a smaller size in order to reduce the computation required for color extraction, for example a 200 pixel by 200 pixel image. Image preprocessing can additionally or alternatively include, for each image, generating a color listing, for example a color histogram representing a distribution of colors in the image. The color histogram can be interpreted as a list of colors in the image with ranking by weights.

The process 400 next can iterate block 415 for each pixel using the color values identified at block 410. Since the item image background is usually white or bright color and occupies a lot of area in the image, some embodiments of process 400 can exclude the background in the color list. As such, the color histogram can be modified in some embodiments to exclude white pixels (if the image background is white) or to identify a color of a border of the image and exclude pixels of the border color. If the image background is non-white, the process 400 can adjust a luminance threshold to ignore pixels of the background color. To exclude background pixels, some embodiments can use RGB color to calculate a luminance in YUV color space. YUV encodes a color taking human perception into account. If the luminance value is greater than 90% this can indicate that the pixel color is a very bright color, and process 400 can ignore that color, as most product image backgrounds are pure white in some embodiments of an electronic catalog. Next, process 400 can convert the color into HSV (Hue, Saturation, Value) color space. To highlight the highly saturated color, process 400 can calculate the weight score by saturation value, for example by multiplying by the frequency of color existence.

At block 420, the process 400 can extract a listing of main or dominant colors (colors corresponding to a relatively high number of pixels) from the colors listing of each image. In some implementations, process 400 can rank the colors listing by the weight score and identify a top number of colors, for example two, five, or more, to get the dominant color list of the image.

Some embodiments can cluster similar colors in the colors listing by quantifying the original colors in RGB, for example from 255^3=16 million colors to 4096 colors in RGB, and generate the color palette for the image based on frequency of occurrence within the clustered colors list. To illustrate, the colors list generated at block 415 can have up to 16 million colors represented in a RGB space. If process 400 directly uses that list to fetch the top N dominant colors, most of these might be very similar to one another and not easily differentiated by human eyes. To make color difference more perceptive and reduce computation, some embodiments of the process 400 can cluster the very similar colors into 4096 kinds of colors in RGB space. For example, process 400 can use liner quantization by splitting the RGB space 0~255 in each dimension into 16 bins, cluster those colors which are located in the same bin, and use the value at the center of the bin to represent the color value for all colors in the bin. Thus, the original color histogram can be compressed to a palette with maximum 4096 colors. Other numbers of bins, for example 8 bins, or greater than 16 bins, can be used in other embodiments based on design choices representing a tradeoff between sensitivity to color difference and computational requirements At block 425, the process 400 can identify a color palette for each image. For example, the process 400 can identify a most frequently occurring color as a main color and can optionally identify one or more additional colors based on occurrence frequency. Turning to the example of FIG. 4B, each color palette can include two colors 445, 450 with color 445 being a main color and color 450 being a secondary or additional color.

At block 430 the process 400 can begin colors comparison and scoring. Process 400 can calculate the Euclidean distances between colors of color sets having one color from each color palette. Process 400 can match the main color in each palette, the second color in each palette, and so on for block 430 and compute Euclidean distances between these colors of the source item and the recommended item. Some embodiments can additionally identify complementary colors (e.g., the complementary color to white is black) of the colors in the palette of the recommended item's image and compute Euclidean distances between the corresponding colors in the source item palette and these complementary colors.

At block 435, the process 400 can generate a color coordination score for the item pair. The process can, for example, rescale the various Euclidean distances generated at block 430, for instance by using Gaussian distribution to rescale the score to a value between 0 and 1 such that closer distances have scores closer to 1 and to enlarge the gap near 0.8 to make the colors difference more sensitive. A maximum value can be selected as the final color coordination score. In one example, the formula and parameters used for the Gaussian distribution can be:

$$y = \exp\left(-\frac{(x-\mu)^2}{2\sigma^2}\right), \mu = 1, \sigma = 0.2$$

where X represents the original score and Y represents the rescaled score.

It will be appreciated that the color palettes used to generate the color coordination scores as described herein can be include one, two, or more colors extracted from each image. For example, some implementations can use five colors. The number of colors in the color palette of a main item and a recommended item can be the same or different. Some implementations can dynamically vary the number of colors in a color palette, for example based on identifying prominent colors of an item using frequency analysis of colors in the colors listing. Some embodiments can identify the complementary color(s) of the color(s) in the palette of one of the main item or the recommended item and additionally calculate Euclidean distances using the complementary colors. For example, one implementation can identify the complementary color of each color in the recommended item's color palette and compare these to each color of the main item's color palette. This can enable the color coordination scoring process to generate high scores not just for similarly-colored items, but also for complementary colored items. Complementary colors can be pre-generated and stored, for example, in a look up table accessible by the color score generator 232B.

Turning to the example of FIG. 4B, which illustrates a comparison of color coordination between source item S1 (a black dress) and recommended items R1 and R2 (black/grey and turquoise handbags), the process 400 selected the top 2 colors represented by RGB data as described above for the image of source item S1 and the images of each of recommended items R1 and R2. In the original color images of FIG. 4B, prior to conversion to black and white for purposes of use herein, the dress S1 is shown with black 445A and burgundy 450A, the purse R1 is shown with back 445B and light gray 450B, and the purse R2 is shown with aqua 445C and medium gray 450C. These colors are respectively depicted in the color palettes 440A, 440B, 440C. The color palette 440A of source item S1 includes main color 445A and secondary color 450A, the color palette 440B of recommended item R1 includes main color 445B and complementary color 450B, and color palette 440C of recommended item R2 includes main color 445C and complementary color 450C. In other embodiments the number of colors in the color palettes can vary, for example using X colors of the source item and Y colors of the recommended item. For item R1, the process 400 can calculate the Euclidean distance between 445A and 445B, 445A and 450B, 450A and 445B, and 450A and 450B, and rescale to (0-1) score, shown as having values of 1.00, 0.38, 0.93, and 0.42, respectively. The process 400 can choose the maximum value which is represented as the minimum distance between each item's dominant colors, shown in color score 445A as being 1.00. Similarly, for item R2, the process 400 can calculate the Euclidean distance between 445A and 445C, 445A and450C, 450A and 445C, and 450A and 450C, and rescale to (0-1) score, shown as having values of 0.66, 0.75, 0.68, and 0.79, respectively. The process 400 can choose the maximum value which is represented as the minimum distance between each item's dominant colors, shown in color score 445B as being 0.79.

The closer distance means the colors are analogous colors, which can look like more harmonious to the human eyes. In the example of FIG. 4B, item R1 (black/white grey bag) got a 1.00 color coordination score with the black dress (item S1). Item R2 (turquoise bag) got a 0.79 color coordination score with the black dress (item S1). Thus, according to the generated color coordination scores, handbag R1 looks like better than handbag R2 when companioned with the dress S1.

Execution Environment

Figure 5:
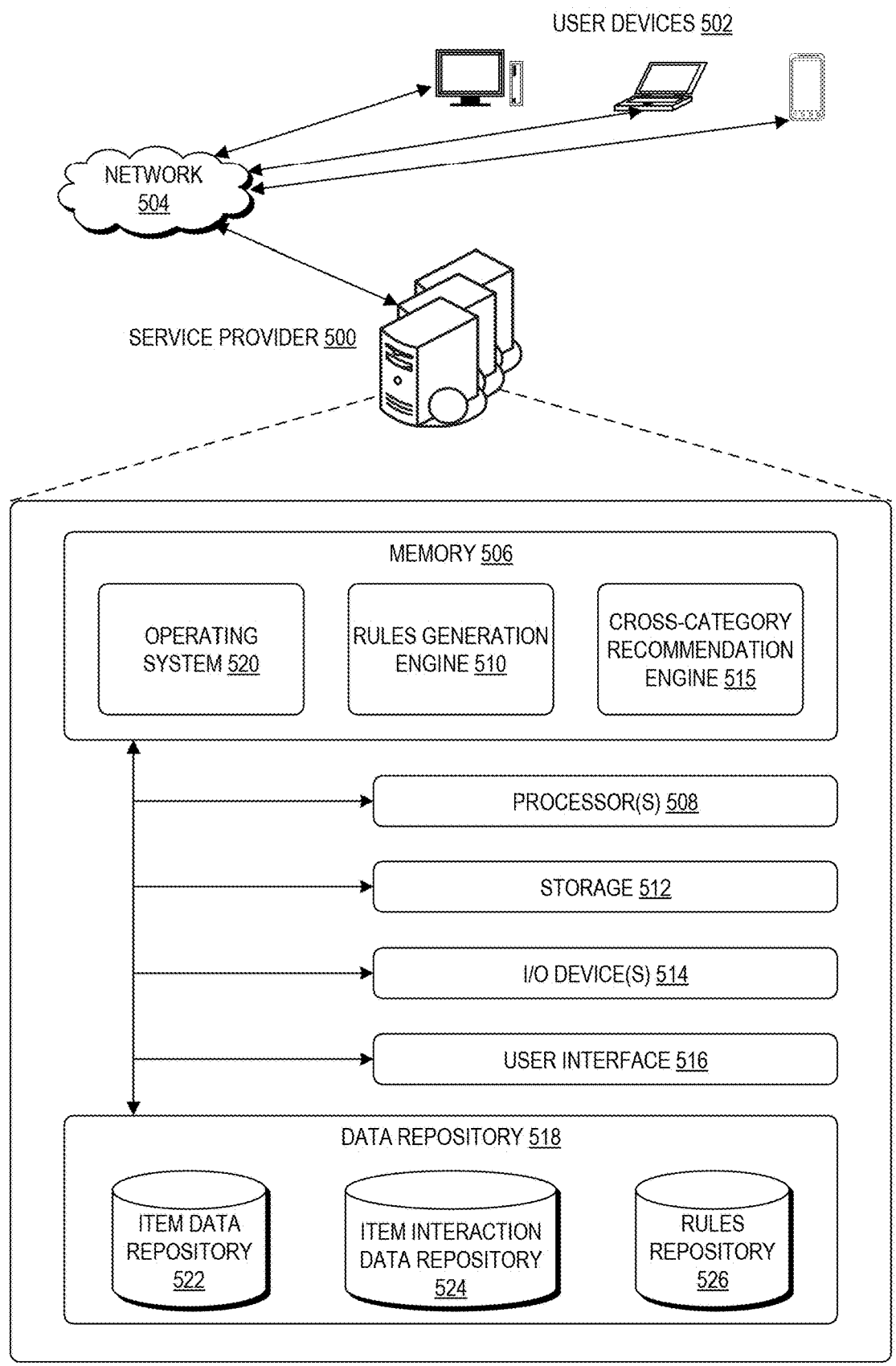
FIG. 5 is a pictorial diagram depicting an illustrative embodiment of an operating environment in which an interactive computing system, for example including the cross-category item collection recommendation engine of FIG. 2A, provides cross-category item collection recommendations.

FIG. 5 is a pictorial diagram depicting an illustrative embodiment of an operating environment in which an interactive computing system, for example including the cross-category item collection recommendation engine of FIG. 2A, provides cross-category item collection recommendations.

The architecture of the interactive computing system 500 may include a memory 506 storing an operating system 520, rules generation engine 510, and cross-category recommendation engine 515, which can be in direct communication with one another or distributed among computing devices within a networked computing system and in communication with each other. Components used for the architecture may depend at least in part upon the type of network and/or environment selected.

The interactive computing system 500 may include one or more computers, perhaps arranged in a cluster of servers or as a server farm. The memory and processors that make up these computers may be located within one computer or distributed throughout many computers as detailed herein. These servers may be configured to train recommendations engines and manage recommendations. For example, the interactive computing system 500 may be configured to manage recommendations offered in connection with an electronic marketplace.

The interactive computing system 500 may include at least one memory 506 and one or more processing units (or processor(s)) 508. The memory 506 may include more than one memory and may be distributed throughout the interactive computing system 500. The memory 506 may store program instructions that are loadable and executable on the processor(s) 508 as well as data generated during the execution of these programs. Depending on the configuration and type of memory, the memory 506 may be volatile (such as random access memory (RAM)) and/or non-volatile (such as read-only memory (ROM), flash memory, or other memory). In some examples, the memory 506 may include multiple different types of memory, such as static random access memory (SRAM), dynamic random access memory (DRAM), or ROM. The memory can store the program instructions as a number of modules that configure processor(s) 508 to perform the various functions described herein, for example operating system 520, rules generation engine 510, and recommendation engine 515.

The memory 506 may include operating system 520 for interacting with the interactive computing system 500. Interactive computing system 500 can host an interactive electronic catalog through which users can view and purchase items.

As discussed above, the rules generation engine 510 may be configured to generate combination rules and validation rules for use in generating cross-category collection recommendations. The cross-category recommendation engine 515 can be configured to implement prediction models generated by the rules generation engine 510 to provide recommendations or predictions, for example to users of an electronic commerce system.

The processor 508 may include one or more general purpose computers, dedicated microprocessors, graphics processors, or other processing devices capable of communicating electronic information and/or training complex machine learning models. Examples of the processor 508 include one or more application-specific integrated circuits (ASICs), field programmable gate arrays (FPGAs), digital signal processors (DSPs) and any other suitable specific or general purpose processors. Computer-executable instruction, software or firmware implementations of the processor may include computer-executable or machine-executable instructions written in any suitable programming language to perform the various functions described. The processor 508 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 500 may also include additional storage 512, which may include removable storage and/or non-removable storage. The additional storage 512 may include, but is not limited to, magnetic storage, optical disks, and/or tape storage. The disk drives and their associated computer-readable media may provide non-volatile storage of computer-readable instructions, data structures, program modules, and other data for the computing devices. The memory 506 and the additional storage 512, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 500 may also include input/output (I/O) device(s) and/or ports 514, such as for enabling connection with a keyboard, a mouse, a pen, a voice input device, a touch input device, a display, speakers, a printer, or other I/O device.

The interactive computing system 500 may also include a user interface 516. The user interface 516 may be utilized by a user to access portions of the interactive computing system 500. In some examples, the user interface 516 may include a graphical user interface, web-based applications, programmatic interfaces such as application programming interfaces (APIs), or other user interface configurations. The user interface 516 can include displays of the recommendations described herein.

The interactive computing system 500 may also include a data store 518. In some examples, the data store 518 may include one or more data stores, databases, data structures, or the like for storing and/or retaining information associated with the interactive computing system 500. Thus, the data store 518 may include data structures, such as an item inventory database 522, item interaction data repository 524, and item attribute data repository 526.

The item data repository 522 may be used to retain information about items available within the interactive computing system 500. As described above, items can include physical and/or digital products available for purchase in an electronic marketplace. In other embodiments items can include advertisements, web pages, and other digital content. The item data repository 522 may be updated as the selection of available items changes over time. The item interaction data repository 524 can store logged user behaviors with respect to the items currently and/or previously in the item inventory database. The rules data repository 526 can include combination and validation rules as described herein.

The interactive computing system 500 can communicate over network 504 with user devices 502. The network 504 can include any appropriate network, including an intranet, the Internet, a cellular network, a local area network or any other such network or combination thereof. User devices 502 can include any network-equipped computing device, for example desktop computers, laptops, smartphones, tablets, e-readers, gaming consoles, and the like. Users can access the interactive computing system 500 and interact with items therein via the network 504 and can be provided with recommendations via the network 504.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An interactive system comprising:
an electronic data store configured to at least store a list of a plurality of items of an electronic catalog of items, each item of the plurality of items associated with a category of a plurality of categories;
a computer-readable memory storing instructions for generating cross-category collections of items; and
one or more processors in communication with the electronic data store and the computer-readable memory, the one or more processors configured by the instructions to at least:
 identify category pairs that each identify categories from which items are frequently purchased together, wherein the category pairs are identified based at least in part by applying a machine learning model to purchase histories of a plurality of users of the electronic catalog;
 generate, based at least partly on the purchase histories of the plurality of users of the electronic catalog and attributes of the plurality of items:
  combination rules representing at least a subset of the category pairs identified by applying the machine learning model to the purchase histories, and
  validation rules representing correlations between attributes of items of the plurality of items identified from analyzing the purchase histories and the attributes; and
 generate, based on the combination rules, a plurality of cross-category item pairs each including a source item and a recommended item associated with a different category than the source item, wherein the recommended item is paired with the source item in a cross-category item pair based at least in part on a determination that a first category of the recommended item is paired with a second category of the source item in a category pair represented in the combination rules;
 for each of the plurality of cross-category item pairs, apply the validation rules to generate a confidence score representing a likelihood that a user will purchase the source item and the recommended item;
 based at least partly on the combination rules and the confidence scores, generate a listing of a collection of items of the plurality of items each associated with a different category of the plurality of categories; and
 cause output of a graphical representation of the collection to a user device for display.

2. The interactive system of claim 1, wherein, to apply the machine learning model to the purchase histories, the one or more processors are configured to at least:
apply an FP-growth algorithm to the purchase histories of the plurality of users of the electronic catalog.

3. The interactive system of claim 2, wherein an output of applying the FP-growth algorithm to the purchase histories includes a listing of frequently purchased together item pairs.

4. The interactive system of claim 3, wherein, to generate the validation rules, the one or more processors are configured to at least:
apply logistic regression to the listing of frequently purchased together item pairs and the attributes of the plurality of items;
identify, based at least partly on applying the logistic regression, a set of weighted item correlation factors representing the correlations between the attributes; and
generate the validation rules based on the weighted item correlation factors.

5. A method comprising, under control of one or more physical computing devices:
accessing a list of a plurality of items of an electronic catalog, each item of the plurality of items associated with a category of a plurality of categories;
identifying category-to-category associations that each identify two or more categories from which items are frequently purchased together, wherein the category-to-category associations are identified based at least in part by applying a machine learning model to purchase histories of a plurality of users of the electronic catalog;
generating combination rules representing at least a subset of the category-to-category associations identified by applying the machine learning model to the purchase histories;
generating, from the list of the plurality of items and based on the combination rules, a plurality of cross-category item pairs each including a source item and a recommended item associated with a different category than the source item, wherein the recommended item is paired with the source item in a cross-category item pair based at least in part on a determination that a first category of the recommended item is associated with a second category of the source item in a category-to-category association represented in the combination rules;
for each of the plurality of cross-category item pairs:
 applying validation rules representing correlations between attributes of items identified from analyzing at least some of the purchase histories of the plurality of users of the electronic catalog, and
 generating a confidence score representing a likelihood that a user will purchase the source item and the recommended item; and
based at least in part on the confidence scores, generating, for recommendation to a user of the electronic catalog, cross category recommendations including a subset of items of the plurality of items each associated with a different category of the plurality of categories.

6. The method of claim 5, wherein the machine learning model comprises an FP-growth algorithm.

7. The method of claim 5, further comprising generating, via the machine learning model, a listing of item pairs identified from the purchase histories as frequently purchased together.

8. The method of claim 7, further comprising generating the validation rules by at least:
applying a second machine learning model to the listing of item pairs and data representing attributes of the plurality of items;
identifying, based at least partly on applying the second machine learning model, a set of weighted item correlation factors representing the correlations between the attributes; and
generating the validation rules based on the weighted item correlation factors.

9. The method of claim 8, wherein the second machine learning model comprises logistic regression.

10. A non-transitory computer readable medium storing computer-executable instructions that, when executed by a processor of a computing device, cause the computing device to perform a process comprising:

accessing a list of a plurality of items of an electronic catalog, each item of the plurality of items associated with a category of a plurality of categories;

identifying category-to-category associations that each identify two or more categories from which items are frequently purchased together, wherein the category-to-category associations are identified based at least in part by applying a machine learning model to purchase histories of a plurality of users of the electronic catalog;

generating combination rules representing at least a subset of the category-to-category associations identified by applying the machine learning model to the purchase histories;

generating, from the list of the plurality of items and based on the combination rules, a plurality of cross-category item pairs each including a source item and a recommended item associated with a different category than the source item, wherein the recommended item is paired with the source item in a cross-category item pair based at least in part on a determination that a first category of the recommended item is associated with a second category of the source item in a category-to-category association represented in the combination rules;

for each of the plurality of cross-category item pairs:
applying validation rules representing correlations between attributes of items identified from analyzing at least some of the purchase histories of the plurality of users of the electronic catalog, and
generating a confidence score representing a likelihood that a user will purchase the source item and the recommended item; and based at least in part on the confidence scores, generating, for recommendation to a user of the electronic catalog, cross-category recommendations including a subset of items of the plurality of items each associated with a different category of the plurality of categories.

11. The non-transitory computer readable medium of claim 10, wherein the machine learning model comprises an FP-growth algorithm.

12. The non-transitory computer readable medium of claim 10 further storing computer-executable instructions for generating, via the machine learning model, a listing of frequently purchased together item pairs.

13. The non-transitory computer readable medium of claim 12 further storing computer-executable instructions for generating the validation rules by at least:

applying a second machine learning model to the listing of item pairs and data representing attributes of the plurality of items;

identifying, based at least partly on applying the second machine learning model, a set of weighted item correlation factors representing the correlations between the attributes; and generating the validation rules based on the weighted item correlation factors.

14. The non-transitory computer readable medium of claim 13, wherein the second machine learning model comprises logistic regression.

15. The non-transitory computer readable medium of claim 10 further storing computer-executable instructions for causing output of a graphical representation of the collection of items to a user device for display to the user.

* * * * *